(12) United States Patent
Kanno et al.

(10) Patent No.: US 6,217,981 B1
(45) Date of Patent: Apr. 17, 2001

(54) ADHESIVE SHEET AND METHOD FOR PRODUCING THE SAME

(75) Inventors: Mamoru Kanno, Sagae; Hidetoshi Abe, Tendo, both of (JP)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/284,573

(22) PCT Filed: Oct. 13, 1997

(86) PCT No.: PCT/US97/18285

§ 371 Date: Apr. 15, 1999

§ 102(e) Date: Apr. 15, 1999

(87) PCT Pub. No.: WO98/18878

PCT Pub. Date: May 7, 1998

(51) Int. Cl.[7] ........................................ C09J 7/02
(52) U.S. Cl. .................. 428/147; 428/141; 428/142; 428/143; 428/343; 428/353; 428/354; 428/355 RA; 428/340; 428/341; 156/230; 156/239; 156/283; 156/276
(58) Field of Search ........................ 428/141, 142, 428/143, 147, 343, 353, 354, 355 RA, 340, 341; 156/230, 239, 283, 276

(56) References Cited

U.S. PATENT DOCUMENTS

| | | | |
|---|---|---|---|
| 3,301,741 | * | 1/1967 | Henrickson et al. ............... 428/343 |
| 3,314,838 | * | 4/1967 | Erwin ..................... 428/343 |
| 4,556,595 | * | 12/1985 | Ochi ....................... 428/143 |
| 4,606,962 | * | 8/1986 | Reylek et al. ............... 428/148 |
| 4,735,837 | | 4/1988 | Miyasaka et al. ............ 428/40 |
| 5,296,277 | * | 3/1994 | Wilson et al. ................ 428/40 |
| 5,300,340 | * | 4/1994 | Calhoun et al. .............. 428/40 |
| 5,466,510 | * | 11/1995 | Oikawa et al. ............... 428/172 |
| 5,589,246 | | 12/1996 | Calhoun et al. .............. 428/120 |
| 5,607,763 | | 3/1997 | Matsuda ..................... 428/323 |
| 6,015,606 | * | 1/2000 | Abe ......................... 428/214 |

FOREIGN PATENT DOCUMENTS

| | | | |
|---|---|---|---|
| 5-72946 | 3/1993 | (JP) | ............. G03G/21/00 |
| 6-287525 | 10/1994 | (JP) | ............. C09J/7/02 |
| 6-322325 | 11/1994 | (JP) | ............. C09J/7/02 |
| 98/08909 | * 3/1998 | (WO) | . |
| 98/18878 | * 5/1998 | (WO) | . |
| 99/35201 | * 7/1999 | (WO) | . |

* cited by examiner

*Primary Examiner*—William P. Watkins, III
(74) *Attorney, Agent, or Firm*—Dale A. Bjorkman

(57) ABSTRACT

An adhesive sheet is disclosed including a flexible substrate (4), and an adhesive layer (20) formed on at least one of the main surfaces of the flexible substrate and containing elastic microspheres (3), in which the adhesive layer has a) an elastic microsphere layer which is in contact with the main surface of the flexible substrate, comprising elastic microspheres (3) and a tacky polymer (2) and has projections containing said elastic microspheres on a surface which is not in contact with said substrate, and b) a layer of tacky polymer (1) which covers the projections containing the elastic microspheres so that raised portions are formed on an adhesion surface (11). Bubbles of air can then escape during application and use because the adhesion surface has a contact area percentage in the range between 20 and 90%. A method of making the adhesive sheet is also disclosed.

11 Claims, 1 Drawing Sheet

ADHESIVE SHEET AND METHOD FOR PRODUCING THE SAME

FIELD OF THE INVENTION

The present invention relates to an adhesive sheet comprising a flexible substrate and an adhesive layer formed on at least one of the main surfaces of the substrate and containing elastic microspheres. More particularly, the invention relates to an adhesive sheet which has a high peeling adhesion strength in a dry state, a high water-resistant adhesion strength and good bubble escapability.

BACKGROUND OF THE INVENTION

The adhesive layer of an adhesive sheet is generally a single layer if it contains elastic microspheres. Such an adhesive sheet is produced by applying a coating liquid containing elastic microspheres and a tacky polymer directly onto the surface of a substrate and drying the applied coating liquid to form a single layer adhesive film as disclosed in JP-A-6-287525. When such an adhesive sheet is press bonded onto an adherent, raised portions comprising the elastic microspheres and the adhesive layer are in spot contact with the adherent, and passages which can communicate with the atmosphere are formed between the adhesive layer and the adherent. Bubbles which have been trapped between the adhesive layer and the adherent can be easily removed when they are forced to escape by the application of a pressure from the back face of the support towards the adherent in the presence of those passages.

However, the adhesive layer tends to maintain the above spot contact state after the adhesion of the adhesive sheet to the adherent (finish pressing), and therefore the peeling adhesion strength is low. For example, a DINOC™ brand film (commercially available from Sumitomo 3M Co. Ltd. of Tokyo, Japan) which is an example of a decorative sheet having an adhesive layer containing no elastic microspheres has a peel adhesion strength (90 degree peeling strength) of at least about 2 kgf/25 mm (when a bonderized steel plate is used as the adherent), while an adhesive sheet having a single layer adhesive film containing elastic microspheres has the peeling adhesion strength of at most 1.0 to 1.5 kgf/25 mm against the same steel plate.

That is, conventional adhesive sheets containing elastic microspheres are suitable as repositionable sheets, but they are unsatisfactory as decorative sheets which require permanent bonding.

Further, water or vapor (or moisture) penetrates into the interface between the adhesive layer and adherent through the passages and thus an adhesion strength decreases, that is, the water-resistant adhesion strength decreases, if the passages remain after the completion of adhering when the adhesive sheet is used for decorating bath rooms, changing rooms, and so on.

One of the reasons for the continuation of spot contact, that is, the passages communicating with the atmosphere, may be that the tacky polymer layer covering the elastic microspheres is in a single layer state having a small thickness in comparison to the diameter of the microspheres, has small flow during the press adhering of the sheet to the adherent and small flow over time (namely, cold flow), and therefore the contact areas of the adhesive layer do not increase readily.

JP-A-6-322325 discloses an example of adhesive sheets having a dual adhesive layer. The used adhesive layer is prepared by laminating a primer layer containing hollow microparticles and a top adhesive layer on the primer layer. The primer layer functions to compensate surface irregularity of the adherent such as a corrugated board, etc. after the adhesive sheet is adhered to the adherent, and thus good adhesion of the sheet to the irregular surface is achieved. However, the contact between the adhesive sheet and adherent is plane contact since the top surface of the adhesive layer has no projections, and therefore the bubble escapability is not good.

JP-U-5-72946 discloses an adhesive sheet or tape having a dual adhesive layer containing elastic microspheres. The disclosed adhesive tape or sheet comprises a substrate, an adhesive layer containing elastic microspheres, and a layer of viscoelastic materials having a thickness of 20 pm inserted between the substrate and adhesive layer. This structure improves the adhesion of the tape or sheet to adherents having irregular surfaces such as a corrugated board, etc. and achieves repositioning properties of the tape or sheet while preventing spontaneous peeling. However, large cold flow cannot be expected with this structure, and the contact areas of adhesive layer do not readily increase.

SUMMARY OF THE INVENTION

The art needs an adhesive sheet which has improved adhesion properties such as high peeling adhesion strength in a dry state, high water-resistant adhesion strength, and so on while maintaining good bubble escapability which is an advantage of adhesive layers containing elastic microspheres.

To solve this problem in the art, the present invention provides an adhesive sheet comprising a flexible substrate, and an adhesive layer formed on at least one of the main surfaces of said flexible substrate and containing elastic microspheres, wherein said adhesive layer comprises a) an elastic microsphere layer which is in contact with the main surface of the flexible substrate, comprising said elastic microspheres and a first tacky polymer and having projections containing said elastic microspheres on a surface which is not in contact with said substrate, and b) a layer of a second tacky polymer which covers said projections containing the elastic microspheres so that raised portions are formed on an adhesion surface.

The presence of raised portions having the specific size on the adhesion surface of the adhesive layer improves the bubble escapability during the adhering step of the adhesive sheet onto the adherent.

The invention also pertains to a method for producing an adhesive sheet, comprising the steps of (a) applying a coating liquid comprising a second tacky polymer on a releasing surface of a release liner, and drying the applied coating liquid to form a layer of tacky polymer, (b) applying a coating liquid comprising elastic microspheres and a tacky polymer on the layer of tacky polymer and drying the applied coating liquid to form an elastic microsphere layer having temporarily raised portions containing the microspheres on its surface, and (c) having a main surface of a flexible substrate in close contact with the surface of said elastic microsphere layer under a specific pressure so that the temporary projections are reversed to form projections having specific sizes on an adhesion surface of an adhesive layer which faces the release liner.

The adhesive layer of the adhesive sheet according to the present invention comprises an elastic microsphere layer and a layer of the second tacky polymer. The elastic microsphere layer is formed so that it has the projections containing the elastic microspheres on the surface which is not in contact with the substrate and it functions as a primer layer for the formation of the raised portions having a specific size. The thickness (or amount) of the tacky polymer which covers the microspheres is relatively small in the elastic microsphere layer which has been formed to provide the effective projections. Therefore, it is difficult for the elastic microsphere layer to improve the adhesion strength, in particular, the peeling adhesion strength (at a peeling angle of 90 degrees) in a dry state and to prevent a large decrease of the peeling adhesion strength (at a peeling angle of 90 degrees) caused by the penetration of water from the atmosphere. Thus, the layer of the second tacky polymer is coated over the projection of the elastic microsphere layer to form the raised portions having a specific size on the adhesion surface. The layer of the second tacky polymer improves the bubble escapability and achieves a high adhesion strength after press adhering the sheet to the adherent.

The invention has the following features and advantages:

The raised portions on the adhesive layer should form passages which communicate with the atmosphere and through which bubbles trapped between the adherent and adhesive layer escape easily by the bubble removing procedures in the press adhering step for the adhesive layer. However, it is important to make the size of passageways as small as possible or for there to be no passageways formed when the adhered sheet is left as it is or after finish pressing which is carried out under a larger pressure than that applied in the above press adhering step for the purpose of increasing the peeling adhesion strength and as such the water-resistant adhesion strength.

The layer of the second tacky polymer flows easily since it covers the projections containing the elastic microspheres without being in direct contact with the microspheres. In particular, the degree of flow when the adhesive sheet which has been press adhered is left standing at room temperature, that is, the cold flow is large. Furthermore, the tacky polymer tends to flow so that the sizes of the passages communicating outside decease in the finishing press adhering. Therefore, the adhesive layer according to the present invention can lead to an improvement of the peeling adhesion strength and as such the water-resistant adhesion strength more effectively than the adhesive layer consisting of a single elastic microsphere layer.

The preferable compressive modulus of the microspheres is in the range between $1 \times 10^4$ and $1 \times 10^7$ dyne/cm$^2$ in view of the above flowability. When the compressive modulus exceeds $1 \times 10^7$ dyne/cm$^2$, the layer of the second tacky polymer may not have sufficient flowability. When the compressive modulus is less than $1 \times 10^4$ dyne/cm$^2$, the peeling adhesion strength as such the water-resistant adhesion strength may not increase.

The compressive modulus is measured using a RSA 11 viscoelastic spectrometer (manufactured by RHEOMETRIX) at 20° C. That is, the temperature dependency of the modulus is measured while raising the temperature from –80° C. to 150° C. and applying a compression strain with the frequency of 1 rad/sec. on a sample. The value measured at 20° C. is used as the compressive modulus.

The thickness of the layer of the second tacky polymer is preferably in the range between 1 and 100 g/m$^2$, more preferably in the range between 5 and 80 g/m$^2$ in terms of a coating weight. When the coating weight is less than 1 g/m$^2$, the improvement of the peeling adhesion strength in a dry state and the water-resistant adhesion strength tends to deteriorate. When the coating weight exceeds 100 g/m$^2$, the bubble escapability tends to decrease.

The elastic microsphere layer comprises elastic microspheres and a tacky polymer (the first tacky polymer).

The first tacky polymer functions to bond the elastic microsphere layer to the substrate and to effectively form the projections containing the elastic microspheres.

The projections containing clusters which consist of a plurality of elastic microspheres can be formed when the elastic microsphere layer is formed by applying a coating liquid containing the elastic microspheres, the first tacky polymer and a solvent onto the layer of the second adhesive layer or the main surface of the substrate and drying the coated liquid.

Furthermore, the adhesion properties of the adhesive layer on the adherent do not deteriorate, if the first and second tacky polymers are mixed up and the mixture flows.

The thickness of the elastic microsphere layer is preferably in the range between 5 and 150 g/m$^2$, more preferably in the range between 10 and 100 g/m$^2$ in terms of a coating weight. When the coating weight is less than 5 g/m$^2$, the adhesion properties may deteriorate. When the coating weight exceeds 150 g/m$^2$, the projections having the sufficient size may not be formed.

The volume average diameter of elastic microspheres is preferably in the range between 10 and 300 pm. When the volume average diameter is less than 10 pm, the bubble escapability tends to decrease. When the volume average diameter exceeds 300 pm, a sufficient adhesion area cannot be achieved even if the second tacky polymer or the mixture of the first and second tacky polymers flows, and therefore the improvement of the peeling adhesion strength and as such the water-resistant adhesion strength is insufficient.

The amounts of the elastic microspheres and the first tacky polymer in the elastic microsphere layer are such that the elastic microspheres are contained preferably in an amount of between 10 and 900 wt. parts, more preferably between 20 and 100 wt. parts per 100 wt. parts of the tacky polymer. When the amount of the elastic microspheres is less than 10 wt. parts, the bubble escapability tends to decrease. When this amount exceeds 900 wt. parts, the adhesion strength of the elastic microsphere layer to the substrate decreases.

The flexible substrate allows the easy press adhering of the adhesive sheet to an adherent and bubble escaping, and also has the following functions. The adhesive layer formed on a temporal releasable support is in close contact with the flexible substrate, and the raised portions having a specific size are easily shaped on the adhesion surface. Therefore, a plastic film having a thickness in the range between 10 and 1000 pm is preferably used as the flexible substrate.

Further features and advantages are disclosed below using the following drawings.

EMBODIMENTS OF THE INVENTION

Figure 1:
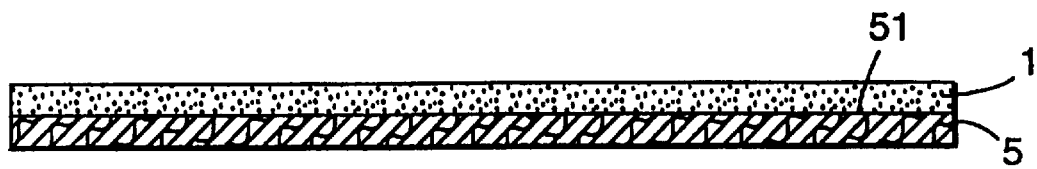
FIG. 1 schematically shows the first subcombination of the adhesive sheet of the present invention.
Figure 1A:
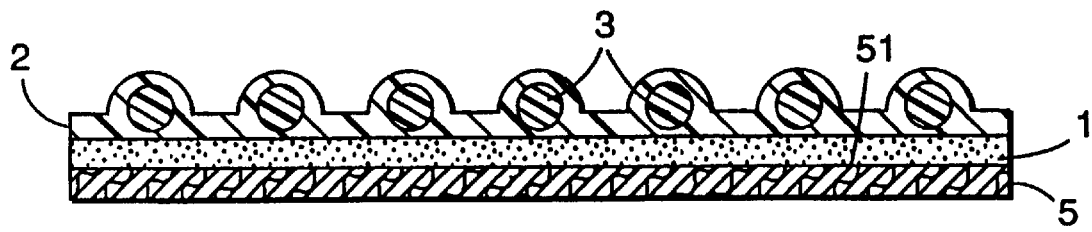
FIG. 1a schematically shows the second subcombination of the adhesive sheet of the present invention.
Figure 1B:
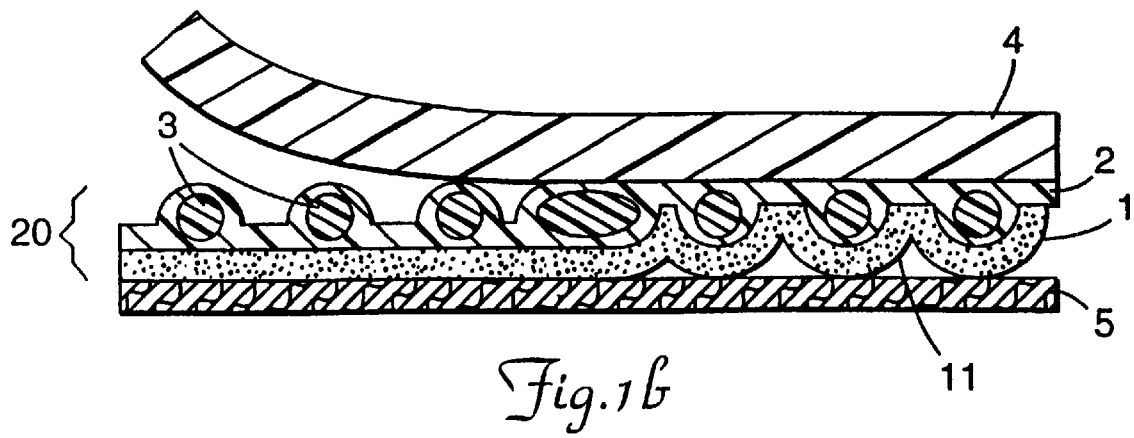
FIG. 1b schematically shows the final step to forming the adhesive sheet of the present invention.

FIGS. 1, 1a, and 1b show the construction of an adhesive sheet of the present invention. Referring to FIG. 1b, and moving from release liner 5 upward, the sheet comprises a layer 1 of a second tacky polymer, a plurality of microspheres 3, a layer 2 of a first tacky polymer, and a substrate 4. The inversion of "first" and "second" concerns the view of layering of the two different tacky polymers from the perspective of the substrate 4.

Flexible Substrate

Any flexible sheets such as a paper sheet, metal film or plastic film can be used as the substrate. "Plastics" include synthetic polymers such as polyvinyl chloride, polyester, polyurethane, polyacrylate, etc.

The surface of the substrate on which the adhesive layer is formed may be treated to increase the adhesion strength of the adhesive layer to the substrate. The surface treatment can be performed by corona treatment, plasma treatment or treatment with chemical agents.

Tacky Polymers

Aqueous emulsion type polymers are preferable as the first tacky polymer composition, since the lamination of the adhesive layer and the clusters of the elastic microspheres can easily be made.

Either solution type polymers or emulsion type polymers can be used as the second tacky polymer composition, while the solution type polymers are preferable since they have excellent properties for improving the water-resistant adhesion strength.

Any polymeric materials which are conventionally used as adhesive materials can be used as the first and second tacky polymers. Examples of the tacky polymers are acrylic polymers, rubbery polymers, silicone polymers, polyurethanes, polyolefins, and so on. Among them, the acrylic polymers are preferable.

A preferred example of the acrylic polymer is a copolymer of at least one acrylic monomer which provides a homopolymer having a glass transition temperature between −50° C. and less than 25° C. (e.g. isooctyl acrylate, 2-ethylhexyl acrylate, n-butyl acrylate, etc.) and at least one vinyl monomer which provides a homopolymer having a glass transition temperature between 25° C. and 150° C. (e.g. methyl methacrylate, acrylic acid, styrene, etc.). The acrylic monomer increases the adhesion properties of the copolymer, and the vinyl monomer increases the cohesive force of the copolymer.

The weight ratio of the acrylic monomer (A) to the vinyl monomer (V) (A:V) is usually in the range between 85:15 and 99:1, preferably in the range between 90:10 and 98:2.

When the amount of the acrylic monomer is too small, the cold flow of the adhesive layer may not occur easily. When the amount of the acrylic monomer is too large, the raised portions of the adhesive layer tends to plastically deform during the storage of the adhesive sheet.

Specific examples of the acrylic polymer are copolymers of isooctyl acrylate and acrylic acid, copolymers of n-butyl acrylate and acrylic acid, copolymers of 2-ethylhexyl acrylate and acrylic acid, and so on.

The molecular weight of the tacky polymer is in a range in which the polymer exhibits the desired adhesive properties. In general, the weight average molecular weight is in the range between 10,000 and 1,000,000.

The tacky polymer may contain any conventional additive such as a tackifier, crosslinking agent, and so on, insofar as the effects of the present invention do not deteriorate.

Elastic Microspheres

The elastic microspheres preferably exhibit tackiness. The tacky elastic microspheres may be produced from a tacky polymer having a compressive modulus of between $1 \times 10^4$ and $1 \times 10^7$ dyne/cm$^2$.

The volume average diameter of the microspheres is preferably in the range between 10 and 300 pm, more preferably in the range between 25 and 250 μm.

The volume average diameter is obtained by measuring diameters of 1000 microspheres with an optical microscope and an image analyzer, and calculating an average value according to the following equation:

Volume average diameter $(\mu m) = \Sigma(d_i^4 \times n_i)/\Sigma(d_i^3 \times n_i)$ wherein $d_i$ is a measured diameter (μm) of a microsphere having an i-th largest diameter, and $n_i$ is the number of microspheres having the diameter $d_i$.

The elastic microspheres are produced preferably from acrylic polymers since the tackiness is effectively improved. The acrylic polymers for the microspheres may be copolymers prepared from the same monomers as those used for the preparation of the adhesive copolymers.

The elastic microspheres are generally prepared by suspension polymerization. For example, a quantity of water, emulsifier, monomers, oil-soluble polymerization initiator, and other additive(s) are charged into a reactor equipped with a mechanical mixer and heated to a specific temperature while stirring to initiate the polymerization reaction. The stirring speed is generally between 10 and 700 rpm, and the heating temperature is generally between 30 and 120° C. The reaction time is generally between several hours to several tens of hours. For example, a production method for such acrylic polymeric microspheres is disclosed in U.S. Pat. No. 4,994,322.

The elastic microspheres may be solid or hollow ones having at least one pore. The polymer for the elastic microspheres may be crosslinked.

Formation of Adhesive Layer

The adhesive layer may be formed as follows:

The elastic microspheres, tacky polymer, solvent, and optional additives are mixed with the mixing apparatus such as a homomixer to disperse or dissolve all the components uniformly, and a coating liquid for each layer is prepared.

The prepared coating liquids are successively coated on a temporal support and dried to form the elastic microsphere layer and the layer of second tacky polymer. The coating liquids can be coated by any of the conventional coating means such as a knife coater, bar coater, roll coater, die coater and so on.

A layer having a uniform thickness can be formed by adjusting the viscosity of the coating liquid in a suitable range. The viscosities of the coating liquids for the elastic microsphere layer and the layer of the second tacky polymer are both in the range between 100 and 10,000 cps. When the viscosity is less than 100 cps, the layer may not be formed at the sufficient coating weight. When the viscosity exceeds 10,000 cps, it may be difficult to apply the coating liquid at a uniform thickness.

The lamination of the layers can be performed as follows:

The production of the adhesive sheet by adhering the adhesive layer which has been formed on the temporal support such as a release paper to the substrate is explained by referring to FIG. 1.

A coating liquid comprising the second tacky polymer is applied on a releasing surface (51) of a release paper (5) at a specific coating weight in the above explained range and dried to form a layer (1) of the second tacky polymer. In general, the drying temperature is between 50 and 150° C.

Then as seen in FIG. 1a, a coating liquid comprising the first tacky polymer (2) and elastic microspheres (3) is applied on the surface of the layer (1) of the second tacky polymer and dried to form an elastic microsphere layer. The above steps produce a laminate comprising the release paper (5), the layer (1) of the second tacky polymer, and the elastic microsphere layer having a plurality of temporal protrusions which contain the elastic microspheres in this order.

In general, the drying temperature in the coating step for the elastic microsphere layer is between 90 and 150° C.

Finally, a flexible substrate (4) is laminated onto the elastic microsphere layer and pressed under a specific pressure, as seen in FIG. 1b. The elastic microsphere layer and the flexible substrate (4) are closely adhered so that the temporal protrusions are reversed to complete the adhesive sheet.

The elastic microsphere layer and the flexible substrate (4) are closely adhered so that the elastic microspheres in the protrusions are temporarily deformed. Then, the deformed elastic microspheres are recovered, and raised portions having a specific size are formed on the surface of adhesive layer (20) which faces the temporal support. The deformed microspheres do not recover just after the adhering of the substrate, but recover after a short time from the adhering of the substrate.

When the deformed microspheres have recovered, partial peeling appears only at an interface between the adhesive layer and the release paper exerting a relatively low adhesion strength. As a result, the raised portions are shaped on the surface of the adhesive layer on the release paper side.

The deformed microspheres recover at a temperature in the range between 20 and 50° C. in general in a period of time of between several seconds and 30 hours.

The above method can be used to form the raised portions having a specific size and containing the elastic microspheres which are covered with a layer of the second adhesive layer on the adhesion surface of adhesive layer.

The pressure in the step for adhering the substrate is usually between 10 and 50 kgf/cm$^2$, preferably in the range between 15 and 30 kgf/cm$^2$. When this pressure is too high, the projections containing the elastic microspheres are plastically deformed, and heights of the raised portions on the adhesive layer will be insufficient. When this pressure is too low, the adhesion between the elastic microsphere layer and the substrate is insufficient, and the projections may not be sufficiently reversed. As a result, the adhesive layer may not be well adhered to the substrate and also raised portions having an effective size may not be formed.

For example, the above laminate and the support are press adhered using a laminator having a pair of press rolls. The material of the press rolls may be metals, rubbers, elastomers and so on.

The press rolls can be heated in the press adhering step. The heating temperature for the rolls is usually in the range between 25 and 80° C. When the roll temperature is less than 25° C., bubbles remain between the flexible support and elastic microsphere layer, and the adhesion between them may decrease. When the roll temperature exceeds 80° C., the exposed surface of the flexible support may be raised due to pressing of the microspheres against the support. The raised portions on the exposed surface of the flexible substrate are not preferable since the appearance of the adhesive sheet, in particular, decorative sheet deteriorates when the adhesive sheet is bonded to the adherent.

Preferably, only a roll which is in contact with the temporal support, that is, the release paper is heated, since the formation of the raised portions on the exposed surface of the flexible support is easily prevented.

The release paper as the temporal support may be left on the adhesive layer so as to protect the adhesive layer. The release paper as the temporal support may be removed and a new release paper may be provided on the adhesive layer.

Alternatively, the adhesive sheet can be produced by laminating the elastic microsphere layer and the layer of second adhesive polymer in this order on the substrate. In this case, the solid content and coating weight of the coating liquid containing the second tacky polymer are adjusted adequately. Preferable coating means are a knife coater and Mayor bar. In this method, the solid content in the coating liquid containing the second tacky polymer is preferably in the range between 20 and 70 wt. %, and the coating weight is preferably in the range between 1 and 100 g/m$^2$.

The raised portions of the adhesive layer which have been formed as described above have a sufficient size for providing good bubble escapability during the press bonding of the adhesive sheet.

The size of raised portions can be expressed in terms of a contact area percentage between the adhesive layer and a plate surface when the contact area percentage is measured by adhering the adhesive sheet onto a flat glass surface under the pressure of 2 kgf/25 cm$^2$. The contact area percentage is a ratio of an actually contacting area between the adhesive layer and the adherent to an apparent contact area.

Concretely, the contact area percentage is measured as follows:

The adhesive layer of the adhesive sheet is adhered to a flat surface of glass plate such as a slide glass and pressed by a roller of 2 kg by reciprocating it over the adhesive sheet one time.

When the glass plate is illuminated with a white light from the glass surface on which the adhesive sheet is not adhered, and the reflected light is observed through a polarized light filter, domains in which the raised portions are in contact with the glass surface are seen as dark, while non-contact domains are seen as white. A photograph of such observed state is taken, and a total area of the contacted domains and the area of the whole observed field (corresponding to the apparent contact area) are measured, and their ratio (the total area of the contacted domains to the area of the whole observed field) is expressed in "percentage", which is the "contact area percentage".

The above measurement can be performed using an optical microscope equipped with an instant camera. In this case, the area of the observed field is usually 1 cm$^2$. A surface roughness Ra of the glass plate used for the measurement is 0.1 μm or less.

The contact area percentage measured as above is preferably in the range between 20 and 90%, more preferably in the range between 30 and 70%, in particular in the range between 40 to 60%. The contact area percentage in this range can improve the adhesive properties of the adhesive sheet such as the high peeling adhesion strength in a dry state, the high water-resistant adhesion strength, etc., while maintaining good bubble escapability.

The contact area percentage increases as the size of the microspheres decreases or the coating weight of the whole adhesive layer increases, while it decreases as the content of the microspheres in the tacky polymer increases. Accordingly, the contact area percentage can be controlled in the above range by adjusting these parameters in the desired ranges.

EXAMPLES

The present invention will be illustrated by the following Examples.

Example 1

A) A silicone release paper (Product No.) RHC-11 (manufactured by SAN-EL CHEMICAL Co., Ltd.) was used as a release paper.

B) An acrylic tackifier (AROSET 8580 (trade name) manufactured by NIPPON CATALYST Co., Ltd. (Compressive modulus 3×106 dyne/cm$^2$; Solid content=45 wt. %; Solvents: toluene/ethyl acetate) was used as the second tacky polymer.

C) Ethyl acetate was used as a diluent for the coating liquid containing the second tacky polymer. About 20 wt. parts of ethyl acetate and 2 wt. parts of a crosslinking agent (COLONATE L55E (trade name) manufactured by NIPPON POLYURETHANE Co., Ltd.) were added to 100 wt. parts of the acrylic tackifier (solution) so that the viscosity of the coating liquid was about 1000 cps.

D) Application of layer of second tacky polymer: The coating liquid for the layer of second adhesive polymer was coated with a knife coater on the release paper as the temporal support and dried to form the layer of second tacky polymer. Drying was carried out at about 65° C. for 90 seconds and then at 95° C. for 90 seconds. The coating weight of the layer of the second tacky polymer was 8 g/m$^2$ in this Example.

E) Elastic microspheres which had been obtained by the suspension polymerization and had the volume average diameter of 38 μm were used as elastic microspheres. The monomer composition comprised isooctyl acrylate and acrylic acid in a molar ratio of 94:6. This copolymer had the compressive modulus of 2.5×10$^6$ dyne/cm$^2$.

F) An aqueous dispersion type adhesive comprising an acrylic tacky polymer (SK DYNE E-1000 manufactured by SOKEN CHEMICAL Co., Ltd.; Solid content=60 wt. %. Compressive modulus 3.5×106 dyne/cm$^2$) was used as the first tacky polymer.

G) Composition of coating liquid for elastic microsphere layer:

The weight ratio of the elastic microspheres to the first tacky polymer was 30:100 in terms of the solid components. The elastic microspheres, the first tacky polymer and a crosslinking agent for first tacky polymer were mixed with a homomixer to disperse them homogeneously. Then the mixture was thickened with an alkali, and a coating liquid was obtained. The crosslinking agent was E-AX (manufactured by SOKEN CHEMICAL Co., Ltd.) in the amount of 1.8 wt. parts per 100 wt. parts of the solution of tacky polymer. The coating liquid had the solid content of 50 wt. % and the viscosity of 1000 Cps.

H) The coating liquid for the elastic microsphere layer was applied onto the above formed layer of the second tacky polymer with a knife coater at a coating weight of 16 g/m$^2$ and dried at about 100° C. for 5 minutes to form an elastic microsphere layer having a plurality of projections containing elastic microspheres, and a laminate consisting of the release paper, the layer of the second tacky polymer and the elastic microsphere layer in this order was obtained.

I) A film of vinyl chloride homopolymer having a thickness of 150 μm was used as the flexible substrate.

J) Adhesion of adhesive layer to substrate: The laminate which had been obtained in the above step H) was laminated on the substrate with the elastic microsphere layer being in contact with the substrate, and the obtained composite was pressed between a rubber roll and metal roll of a laminator, during which the flexible substrate and release paper were in contact with the rubber roll and metal roll, respectively. The pressing conditions included a nip pressure of 20 kgf/cm$^2$, and a metal roll temperature of 40° C. The release paper was removed from the composite after 30 hours from the finish of pressing and the surface of adhesive layer was observed with an optical microscope. The surface of the adhesive layer was covered with the second tacky polymer, and a number of raised portions containing clusters of a plurality of elastic microspheres were observed.

K) Evaluation of adhesive sheet

The produced adhesive sheet was subjected to the evaluation of the peeling adhesion strength in the dry state, water resistant peeling force and bubble escapability as follows:

Peeling Adhesion Strength

A sample of an adhesive sheet having the size of 150 mm×25 mm was adhered to a bonderized steel plate at 20° C., 65% RH with a roller of 2 kg, and aged at 20° C., 65% RH for 48 hours. Then, the peeling force of the sample was measured with a tensile tester at a peeling angle of 90°, at a peeling rate of 300 mm/min.

Water Resistant Peeling Adhesion Strength

A 150 mm×25 mm sample of an adhesive sheet was prepared and adhered to a bonderized steel plate at 200° C., 65% RH with a roller of 2 kg, and aged at 20° C., 65% RH for 24 hours and further in warm water at 40° C. for one week. The sample was removed from water, water was wiped off from the surface of the sample and the sample was kept standing at 20° C., 65% RH for 5 minutes. Then, the peeling force of the sample was measured with a tensile tester at a peeling angle of 90° at a peeling rate of 300 mm/min.

Bubble Escapability

A 100 mm×100 mm sample of an adhesive sheet was placed on a flat acrylic resin plate and pressed by a squeezer towards the center of the adhesive sheet to gather bubbles. A roller of 2 kg was rolled over the bubbles four times, and the degree of bubble escape was observed. The sheet was ranked "OK" when all the bubbles escaped, while the sheet was ranked "NG" (No Good) when any bubbles remained.

The results are shown in Table 1.

Examples 2–9

The adhesive sheets were produced in the same manner as in Example 1 except that the coating weight of the layer of second tacky polymer, the volume average diameter of the elastic microspheres and the coating weight of the elastic microsphere layer were changed as shown in Table 1.

Then, each adhesive sheet was subjected to the same evaluation tests as in Example 1. The results are shown in Table 1.

Comparative Examples A–C

The adhesive sheets were produced in the same manner as in Example 1 except that the volume average diameter of elastic microspheres and the coating weight of the elastic microsphere layer were changed as shown in Table 2, and the coating liquid for the elastic microsphere layer was coated directly on the substrate and dried to form a single layer adhesive layer.

Then, each adhesive sheet was subjected to the same evaluation tests as in Example 1. The results are shown in Table 2.

The adhesive sheets produced in Comparative Examples A and B had very low water resistant peeling forces since no layer of second tacky polymer was provided.

It was difficult to form passages which communicate with the atmosphere between the adhesive layer of the adhesive sheet produced in Comparative Example C and the adherent, and thus the bubble escapability was not good although the water resistant adhesion strength was relatively high since the coating weight of the layer containing elastic microspheres was increased.

Comparative Example D

The adhesive sheet was produced in the same manner as in Example 1 except that the coating liquid for the layer of the second adhesive polymer was coated directly onto the substrate and dried to form a single layer adhesive layer.

Then, the adhesive sheet was subjected to the same evaluation tests as in Example 1. The results are shown in Table 2.

The adhesive sheet of Comparative Example D had low bubble escapability since no elastic microsphere layer was provided.

TABLE 1

| Ex. No. | Coating Wt. 2nd Tacky Polymer (g/m²) | Ave. Dia. Elastic Micro-spheres (μm) | Coating Wt. Elastic Micro-sphere Layer (g/m²) | Peeling Adhesion Strength in dry state (kgr/25 mm) | Water Resistant Peeling Strength (kgr/25 mm) | Bubble Escap-ability |
|---|---|---|---|---|---|---|
| 1 | 8 | 38 | 16 | 2.0 | 1.7 | OK |
| 2 | 15 | 38 | 18 | 2.2 | 2.0 | OK |
| 3 | 21 | 38 | 20 | 2.3 | 2.1 | OK |
| 4 | 12 | 135 | 50 | 2.2 | 1.8 | OK |
| 5 | 23 | 135 | 56 | 2.5 | 2.2 | OK |
| 6 | 35 | 135 | 62 | 2.7 | 2.4 | OK |
| 7 | 46 | 200 | 56 | 2.4 | 2.2 | OK |
| 8 | 53 | 200 | 62 | 2.6 | 2.5 | OK |
| 9 | 62 | 200 | 67 | 2.7 | 2.8 | OK |

TABLE 2

| Ex. No. | Coating Wt. 2nd Tacky Polymer (g/m²) | Ave. Dia. Elastic Micro-spheres (μm) | Coating Wt. Elastic Micro-sphere Layer (g/m²) | Peeling Adhesion Strength in dry state (kgr/25 mm) | Water Resistant Peeling Strength (kgr/25 mm) | Bubble Escap-ability |
|---|---|---|---|---|---|---|
| A | — | 30 | 20 | 0.6 | 0.5 | OK |
| B | — | 135 | 52 | 1.2 | 0.7 | OK |
| C | 21 | 200 | 123 | 2.1 | 1.8 | NG |
| D | 12 | — | — | 2.2 | 2.2 | NG |

The claims of the invention follow.

What is claimed is:

1. An adhesive sheet comprising a flexible substrate (4), and an adhesive layer (20) formed on at least one of the main surfaces of said flexible substrate and containing elastic microspheres (3), wherein said adhesive layer comprises
    a) an elastic microsphere layer which is in contact with the main surface of the flexible substrate, comprising said elastic microspheres (3) and a first tacky polymer (2) and having projections containing said elastic microspheres on a surface which is not in contact with said substrate, and
    b) a layer of a second tacky polymer which covers said projections containing the elastic microspheres so that raised portions are formed on an adhesion surface (11).

2. The adhesive sheet according to claim 1, wherein said layer of the second tacky polymer is a coated layer, and the coating weight of the layer is between 1 and 1 g/m².

3. The adhesive sheet according to claim 1, wherein said elastic microsphere layer is a coated layer, and the coating weight of the layer is between 5 and 150 g/m².

4. The adhesive sheet according to claim 1, wherein the adhesive surface (11) has a contact area percentage in the range between 20 and 90%.

5. A method for producing an adhesive sheet as claimed in claim 1, comprising the steps of:
    (a) applying a coating liquid comprising a second tacky polymer (1) on a releasing surface (51) of a release liner (5), and drying the applied coating liquid to form a layer of tacky polymer (1),
    (b) applying a coating liquid comprising elastic microspheres (3) and a tacky polymer (2) on the layer of tacky polymer (1) and drying the applied coating liquid to form an elastic microsphere layer having temporarily raised portions containing the microspheres on its surface, and
    (c) having a main surface of a flexible substrate (4) in close contact with the surface of said elastic microsphere layer under a specific pressure so that the temporary projections are reversed to form projections having specific sizes on an adhesion surface (11) of an adhesive layer (20) which faces the release liner (5).

6. The method according to claim 5, wherein the coating weight of the coating liquid comprising the second tacky polymer is between 1 and 100 g/m².

7. The method according to claim 5, wherein the coating weight of the coating liquid comprising the elastic microspheres and the first tacky polymer is between 5 and 150 g/m².

8. The method according to claim 5, wherein the adhesive surface (11) has a contact area percentage in the range between 20 and 90%.

9. The adhesive sheet according to claim 2, wherein said elastic microsphere layer is a coated layer, and the coating weight of the layer is between 5 and 150 g/m².

10. The adhesive sheet according to claim 2, wherein the adhesive surface (11) has a contact area percentage in the range between 20 and 90%.

11. The adhesive sheet according to claim 2, wherein the adhesive surface (11) has a contact area percentage in the range between 20 and 90%.

* * * * *

UNITED STATES PATENT AND TRADEMARK OFFICE
CERTIFICATE OF CORRECTION

PATENT NO. : 6,217,981 B1
DATED : April 17, 2001
INVENTOR(S) : Mamoru Kanno et al.

Page 1 of 1

It is certified that error appears in the above-identified patent and that said Letters Patent is hereby corrected as shown below:

Column 12,
Line 17, "1 g/m$^2$" should read -- 100 g/m$^2$ --.

Signed and Sealed this

Twenty-third Day of April, 2002

Attest:

JAMES E. ROGAN
*Attesting Officer*  *Director of the United States Patent and Trademark Office*